(12) United States Patent
Wang et al.

(10) Patent No.: US 11,353,655 B2
(45) Date of Patent: Jun. 7, 2022

(54) INTEGRATED OPTICAL POLARIZER AND METHOD OF MAKING SAME

(71) Applicant: KVH Industries, Inc., Middletown, RI (US)

(72) Inventors: Liming Wang, Tinley Park, IL (US); Thomas D. Monte, Tinley Park, IL (US)

(73) Assignee: KVH INDUSTRIES, INC., Middletown, RI (US)

( * ) Notice: Subject to any disclaimer, the term of this patent is extended or adjusted under 35 U.S.C. 154(b) by 0 days.

(21) Appl. No.: 16/419,481

(22) Filed: May 22, 2019

(65) Prior Publication Data
US 2020/0371286 A1    Nov. 26, 2020

(51) Int. Cl.
G02B 6/126 (2006.01)
G02B 6/125 (2006.01)
G02B 6/12 (2006.01)

(52) U.S. Cl.
CPC .......... *G02B 6/126* (2013.01); *G02B 6/125* (2013.01); *G02B 2006/12061* (2013.01); *G02B 2006/12116* (2013.01); *G02B 2006/12119* (2013.01)

(58) Field of Classification Search
CPC .......... G02B 6/125; G02B 6/126; G02B 2006/12061; G02B 2006/12119
USPC .......................................... 385/11
See application file for complete search history.

(56) References Cited

U.S. PATENT DOCUMENTS

| 4,420,259 A | 12/1983 | Taylor |
|---|---|---|
| 4,678,267 A | 7/1987 | Burns |
| 4,842,358 A | 6/1989 | Hall |
| 4,890,922 A | 1/1990 | Wilson |

(Continued)

FOREIGN PATENT DOCUMENTS

| CN | 107843957 A | 3/2018 |
|---|---|---|
| EP | 0279603 A2 | 8/1988 |

(Continued)

OTHER PUBLICATIONS

J. F. Bauters, et al., "Ultralow-Loss Planar Si3N4 Waveguide Polarizers," IEEE Photonics Journal, 5(1), Article S/N: 6600207 (2013).

(Continued)

*Primary Examiner* — Michelle R Connelly
(74) *Attorney, Agent, or Firm* — Hamilton, Brook, Smith & Reynolds, P.C.

(57) ABSTRACT

An integrated optical polarizer for generating linear polarizing light may be formed in a photonic integrated circuit (PIC) for applications that require stable output state of polarization. The integrated polarizer may be built by using the same materials already present in the PIC without use of other additional layers and claddings, and without other additional structural modification to the waveguide profile. The integrated polarizer comprises a plurality of bending waveguides of a pre-determined radius that are connected to each other in sequence. The bending waveguide has a high birefringence and a loose confinement to conduct one polarization mode and attenuate the other polarization mode. The polarization discrimination is controlled with the degree of the mode confinement, the bending radius, and the number of the bending waveguides that are connected in series.

28 Claims, 8 Drawing Sheets

(56) References Cited

U.S. PATENT DOCUMENTS

| | | | |
|---|---|---|---|
| 4,938,594 A | 7/1990 | Pavlath | |
| 4,969,742 A | 11/1990 | Falk | |
| 5,037,205 A | 8/1991 | Pavlath | |
| 5,194,917 A | 3/1993 | Regener | |
| 5,223,911 A | 6/1993 | Suchoski | |
| 5,321,503 A | 6/1994 | Bramson | |
| 5,365,338 A | 11/1994 | Bramson | |
| 5,393,371 A | 2/1995 | Chang et al. | |
| 5,436,992 A * | 7/1995 | Wang | G02B 6/126 385/14 |
| 5,475,771 A * | 12/1995 | Hosoi | G02B 6/126 385/11 |
| 5,537,671 A | 7/1996 | Toyama et al. | |
| 5,579,424 A | 11/1996 | Schneider | |
| 5,600,745 A | 2/1997 | Wuu | |
| 5,627,644 A | 5/1997 | Sanders | |
| 5,729,641 A | 3/1998 | Chandonnet | |
| 5,838,844 A * | 11/1998 | Van Dam | G02B 6/12011 385/14 |
| 5,946,434 A * | 8/1999 | Lee | G02B 6/126 385/39 |
| 5,982,961 A | 11/1999 | Pan | |
| 6,108,086 A | 8/2000 | Michal | |
| 6,140,009 A * | 10/2000 | Wolk | B41M 5/38214 430/200 |
| 6,163,632 A | 12/2000 | Rickman | |
| 6,293,688 B1 | 9/2001 | Deacon | |
| 6,360,038 B1 | 3/2002 | Grubsky | |
| 6,445,455 B1 | 9/2002 | Hall | |
| 6,680,472 B1 | 1/2004 | Thingboet | |
| 6,760,520 B1 | 7/2004 | Medin | |
| 6,905,904 B2 * | 6/2005 | Gardner | C03C 17/3405 385/130 |
| 6,920,257 B1 | 7/2005 | Mekis | |
| 7,061,610 B2 | 6/2006 | Mittelstein | |
| 7,085,441 B1 | 8/2006 | Kozlov | |
| 7,218,809 B2 | 5/2007 | Zhou | |
| 7,224,878 B1 | 5/2007 | Wessels | |
| 7,899,286 B2 | 3/2011 | Yoshida | |
| 8,121,874 B1 | 2/2012 | Guheen | |
| 9,411,098 B2 * | 8/2016 | Onaka | G02B 27/286 |
| 9,690,045 B2 * | 6/2017 | Goodwill | G02B 6/125 |
| 9,739,938 B2 | 8/2017 | Shi | |
| 9,746,612 B2 | 8/2017 | Lipson | |
| 10,108,789 B2 | 10/2018 | Lehmann et al. | |
| 10,274,319 B2 | 4/2019 | Wang | |
| 10,488,596 B2 | 11/2019 | Akiyama | |
| 10,545,288 B2 * | 1/2020 | Ma | G02B 6/14 |
| 10,921,682 B1 | 2/2021 | Wang | |
| 11,092,748 B2 | 8/2021 | Wang | |
| 2002/0003918 A1 | 1/2002 | Ooi | |
| 2002/0197037 A1 | 1/2002 | Bailey | |
| 2002/0024786 A1 | 2/2002 | Sanders | |
| 2002/0149780 A1 | 10/2002 | Trinh | |
| 2003/0081902 A1 | 5/2003 | Blauvelt | |
| 2004/0057667 A1 | 3/2004 | Tamada | |
| 2004/0168234 P1 | 8/2004 | Fischer | |
| 2004/0223695 A1 | 11/2004 | Kersten | |
| 2005/0021348 A1 | 1/2005 | Chan | |
| 2005/0025427 A1 * | 2/2005 | Dougherty | G02B 6/125 385/48 |
| 2006/0251849 A1 | 11/2006 | Blauvelt | |
| 2007/0053625 A1 | 3/2007 | Ichioka | |
| 2007/0229838 A1 | 10/2007 | Greening | |
| 2008/0291459 A1 | 11/2008 | Meyer | |
| 2009/0087144 A1 | 4/2009 | Yoshida | |
| 2009/0190876 A1 * | 7/2009 | Doi | G02B 6/126 385/11 |
| 2010/0137849 A1 | 6/2010 | Bhandari | |
| 2012/0217419 A1 | 8/2012 | Riesen et al. | |
| 2013/0202250 A1 * | 8/2013 | Guattari | G02B 6/122 385/14 |
| 2013/0308897 A1 | 11/2013 | Sercel | |
| 2014/0075357 A1 | 3/2014 | Flores | |
| 2014/0185979 A1 | 7/2014 | Evans | |
| 2014/0376001 A1 | 12/2014 | Swanson | |
| 2014/0376083 A1 * | 12/2014 | Onaka | G02B 6/29346 359/489.08 |
| 2015/0021291 A1 | 1/2015 | Shastri | |
| 2015/0212271 A1 | 7/2015 | Chen | |
| 2015/0277042 A1 * | 10/2015 | Goodwill | G02B 6/126 385/11 |
| 2015/0277156 A1 | 10/2015 | Kondou | |
| 2017/0131472 A1 | 5/2017 | Kobyakov | |
| 2017/0168234 A1 | 6/2017 | Shi | |
| 2017/0192171 A1 * | 7/2017 | Shi | G02B 6/126 |
| 2017/0205578 A1 * | 7/2017 | Van Thourhout | G02B 6/2766 |
| 2017/0205583 A1 | 7/2017 | Bennett | |
| 2017/0329082 A1 * | 11/2017 | Ma | G02B 6/126 |
| 2018/0120504 A1 | 5/2018 | Qi | |
| 2018/0259337 A1 | 9/2018 | Wang | |
| 2019/0086614 A1 | 3/2019 | Wang | |
| 2020/0116489 A1 * | 4/2020 | Wang | G02B 6/29302 |
| 2021/0240050 A1 | 8/2021 | Khan | |

FOREIGN PATENT DOCUMENTS

| | | |
|---|---|---|
| EP | 0893671 | 1/1990 |
| EP | 0379520 A1 | 8/1990 |
| EP | 0883000 A1 | 12/1998 |
| EP | 1025422 A1 | 8/2000 |
| EP | 1396741 A1 | 3/2004 |
| EP | 2096408 A2 | 4/2008 |
| EP | 2246663 A2 | 11/2010 |
| EP | 3454101 A1 | 3/2019 |
| GB | 2201256 A | 8/1988 |
| JP | H08226822 A | 9/1996 |
| JP | H09159869 A | 6/1997 |
| JP | 20070272121 A | 10/2007 |
| JP | 20120215901 A | 11/2012 |
| JP | 2013255086 A | 12/2013 |
| WO | 198901534 A1 | 11/1989 |
| WO | 2015108488 A1 | 7/2015 |
| WO | 2016010528 A1 | 1/2016 |
| WO | 2018165238 A1 | 9/2018 |
| WO | 2018175524 A1 | 9/2018 |
| WO | 2019055663 A1 | 3/2019 |
| WO | 2020077216 A1 | 4/2020 |
| WO | 2020092789 A1 | 5/2020 |
| WO | 2021154970 A1 | 8/2021 |

OTHER PUBLICATIONS

International Search Report and Written Opinion for PCT/US2020/033092 dated Sep. 4, 2020 titled "Integrated Optical Polarizer and Method of Making Same".

Lu, M. et al., "Field Patterns of the TE Modes in Ridge-Trough Waveguide", International Journal of Infrared and Millimeter Waves, Kluwer Academic Publishers—Plenum Publishers, NE, vol. 23, No. 8, Aug. 1, 2002.

Pu, M et al., "Ultra-low-loss inverted taper coupler for silicon-on-insulator ridge waveguide", Optics Communications, Elsevier, Amsterdam, NL, vol. 283, No. 19, Oct. 1, 2010.

International Search Report and Written Opinion for PCT/US2020/045877 dated Nov. 9, 2020 titled "Integrated Optical Phase Modulator and Method of Making Same".

Cheng, Z. J., et al., "Polymer-waveguide-based vertical coupler", Optics Communications, vol. 260, No. 2, Apr. 15, 2006.

Florjanczyk, M., et al., "Tiny spectrometer enables cost-effective space-borne sensing" SPIE Newsroom, 10.1117/2.1200912.002524, 2009.

Garanovich, I., et al., "Nonlinear directional coupler for polychromatic light", Optics Letters vol. 32, Issue 5, pp. 475-477 (2007).

Hammer, M., et al., "Hybrid coupled-mode modeling in 3D: perturbed and coupled channels, and waveguide crossings", Journal of Optical Society of America, vol. 34, No. 3, Mar. 1, 2017.

Hatta, A.M., et al., "A simple integrated ratiometric wavelength monitor based on a directional coupler", Optik 125 (2014) 795-798.

Hatta, A.M., et al. "Design of the optical core of an integrated ratiometric wavelength monitor" Proceedings 14th European Con-

(56) References Cited

OTHER PUBLICATIONS ference on Integrated Optics: ECIO 08 Eindhoven: Jun. 11-13, 2008, Eindhoven University of Technology, The Netherlands, paper, ThP25.
Humaira, Z., et al: "Integrated silicon photonic TE-pass polarizer", 2016 Photonics North (PN), IEEE, May 24, 2016 (May 24, 2016).
Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.
Leijtens, X., et al., "Arrayed Waveguide Gratings", in "Wavelength Filters in Fibre Optics", vol. 123 of the series Springer Series in Optical Sciences pp. 125-187 (date uknown).
Muneeb, M., et al., "Silicon-on-insulator shortwave infrared wavelength meter with integrated photodiodes for on-chip laser monitoring", Nov. 3, 2014 I vol. 22, No. 22 I DOI:10.1364/OE.22.027300 I Optics Express 27300.
Seyringer, D., et al., "Arrayed Waveguide Gratings", SPIE Press Book, Date Published: Jun. 3, 2016, ISBN: 9781510603608, vol. SL16.
Shang. K., et al., "Low-loss compact multilayer silicon nitride platform for 3D photonic integrated circuits" Optics Express, vol. 23, No. 16, Aug. 6, 2015.
Srinivasan, S., et al., "Design of integrated hybrid silicon waveguide optical gyroscope", Optics Express 24988, vol. 22, No. 21, Oct. 20, 2014.
Tan, Y., et al., "Polarization-selective microring resonators", Optics Express, vol. 25, No. 4, Feb. 15, 2017 (Feb. 15, 2017).
Tran, M., et al., "Integrated optical driver for interferometric optical gyroscopes", Optics Express 3827,vol. 25, No. 4. Feb. 20, 2017.
Wang, P., et al., "Passive photonic integrated ratiometric wavelength monitor with resolution better than 15 pm", vol. 25, No. 3 I Feb. 6, 2017 I Optics Express 2940.
Wang, P., et al. "Wavelength Measurement Based on a Silicon-on-Insulator Directional Coupler Integrated Device", Sensors 2015, 15 21281.
Yu, C., et al., "Stable and Compact Optical Module for Fiber-Optic Gyroscope Application", Fiber and Integrated Optics, 33:306-314, 2014.
International Search Report and Written Opinion for PCT/US2018/021262 dated Jun. 15, 2018 entitled "Photonic Integrated Circuit For an Interference Fiber Optic Gyroscope (IFOG)".
International Search Report and Written Opinion for PCT/US2018/023472 dated Jun. 29, 2018 entitled "Integrated Optic Wavemeter And Method For Fiber Optic Gyroscopes Scale Factor Stabilization".
International Search Report and Written Opinion for PCT/US2018/050896 dated Jan. 7, 2019 entitled "Method And Apparatus For Self-Alignment Connection Of Optical Fiber To Waveguide Of Photonic Integrated Circuit".
International Search Report and Written Opinion for PCT/US2019/055849 dated Mar. 11, 2020, titled "Photonic Integrated Circuits, Fiber Optic Gyroscopes And Methods For Making The Same".
International Search Report and Written Opinion for PCT/US2019/059195 dated Jan. 16, 2020 entitled "Method and Apparatus For Control and Suppression of Stray Light in a Photonic Integrated Circuit".
Park, H., et al. "Device and Integratino Technology for Silicon Photonic Transmitters", IEEE Journal of Selectred Topics in Quantum Electronics, vol. 17, No. 3, May/Jun. 2011.
International Preliminary Report on Patentability for PCT/US2019/055849 dated Apr. 8, 2021, titled "Photonic Integrated Circuits, Fiber Optic Gyroscopes And Methods For Making The Same".
International Preliminary Report on Patentability for PCT/US2019/059195 dated May 14, 2021 titled "Method and Apparatus For Control and Suppression of Stray Light in a Photonic Integrated Circuit".
Hochber, M., et al., "Silicon photonics: the next fabless semiconductor industry", IEEE Solid-State Circuits Magazine, IEEE, USA, vol. 5, No. 1, Mar. 1, 2013.
Ren, T., et al., "An Integrated Low-Voltage Broadband Lithium Niobate Phase Modulator", IEEE Photonics Technology Letters, vol. 31, No. 11, Jun. 1, 2019.
Sanders, G., et al., "Improvements to Signal Processing and Component Minaturization of Compact Resonator Fiber Optic Gyroscopes", 2018 DGON Inertial Sensors and Systems (ISS), IEEE, Sep. 11, 2018.
Steier, W.H., et al., "Polymer Electro-Optic Devices for Integrated Optics", Chemical Physics, Amsterdam, NL, vol. 245, No. 1-03, Jul. 1, 1999.
International Search Report and Written Opinion for PCT/US2021/015454 dated Jun. 15, 2021 titled "Integrated Modulator Structure for In-situ Power Balancing in Photonic Fiber Optic Gyroscopes".
International Preliminary Report on Patentability for PCT/US2020/033092 dated Dec. 2, 2021 titled "Integrated Optical Polarizer and Method of Making Same".

\* cited by examiner

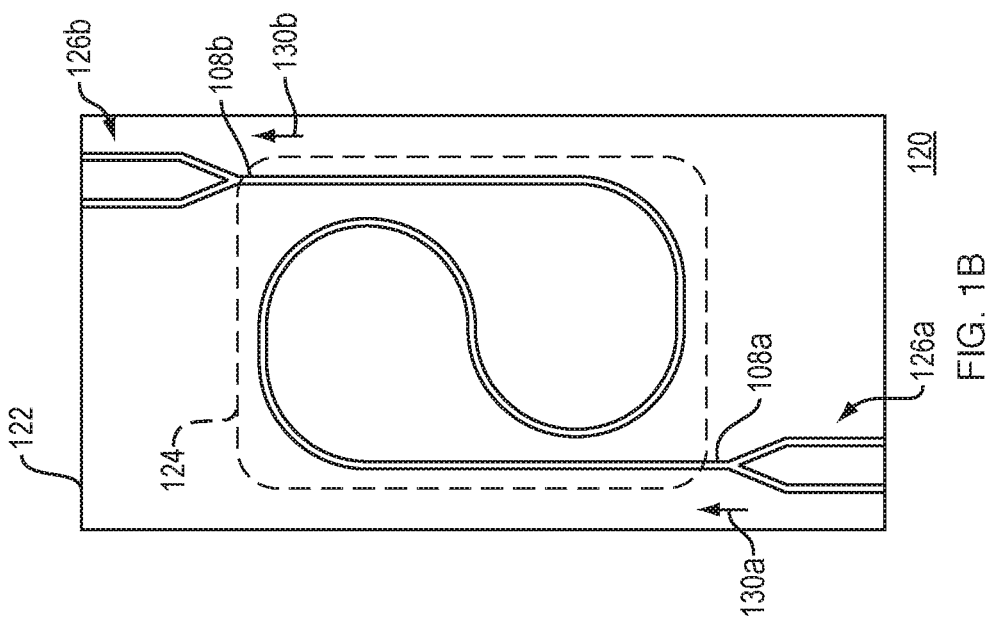
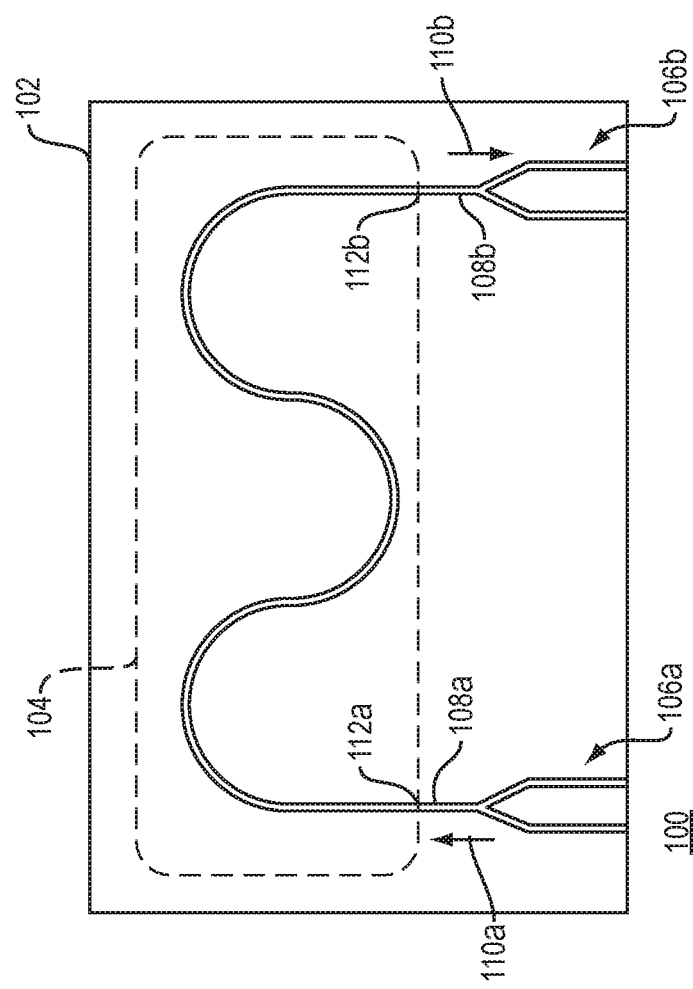

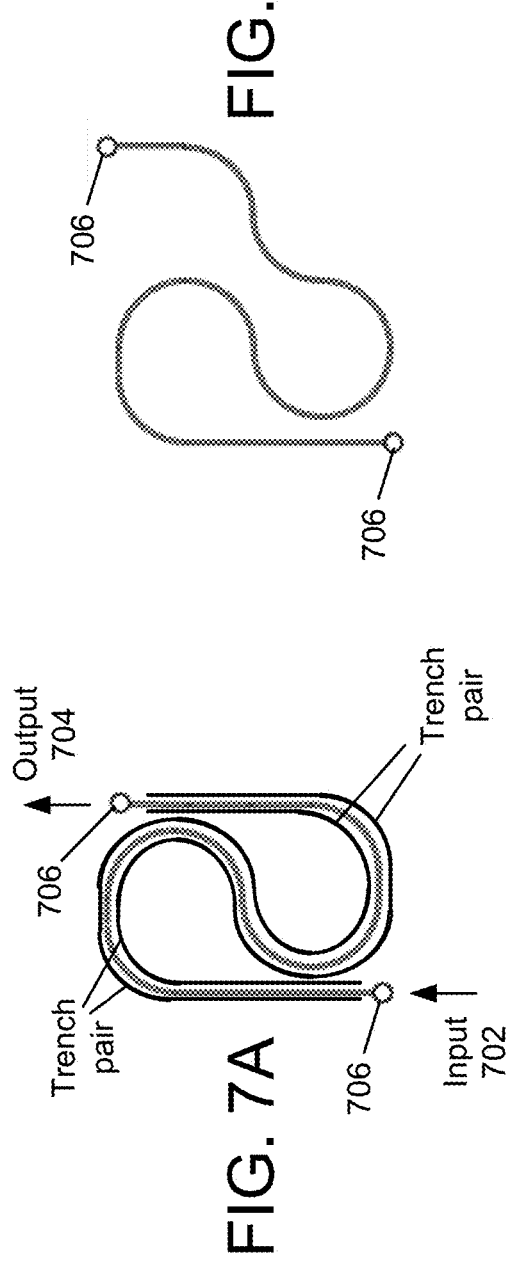
FIG. 7A
FIG. 7B
FIG. 7C
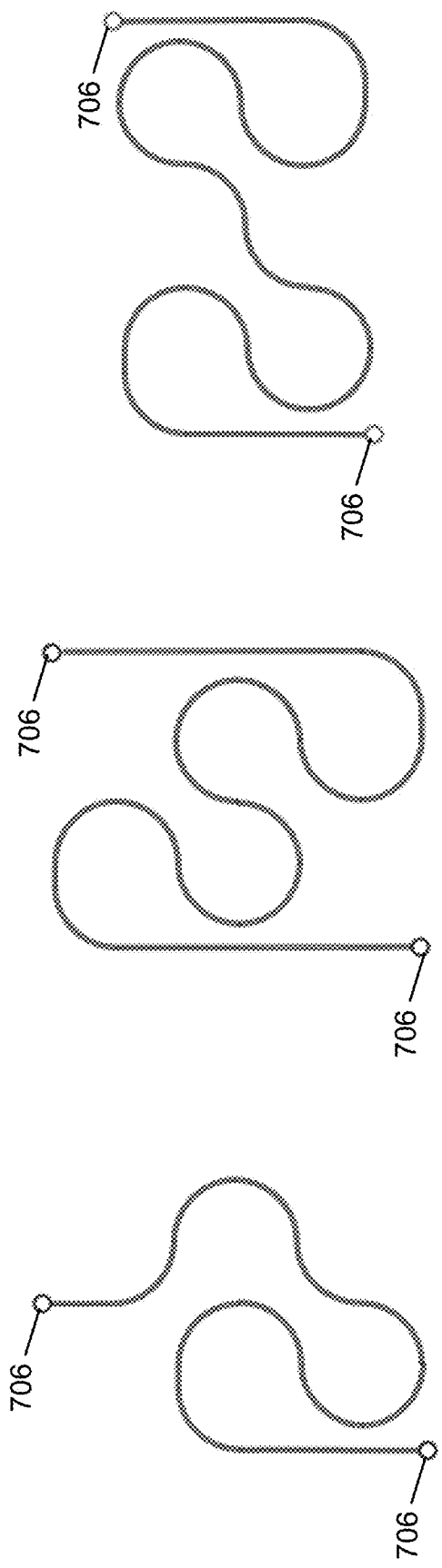
FIG. 7D
FIG. 7E

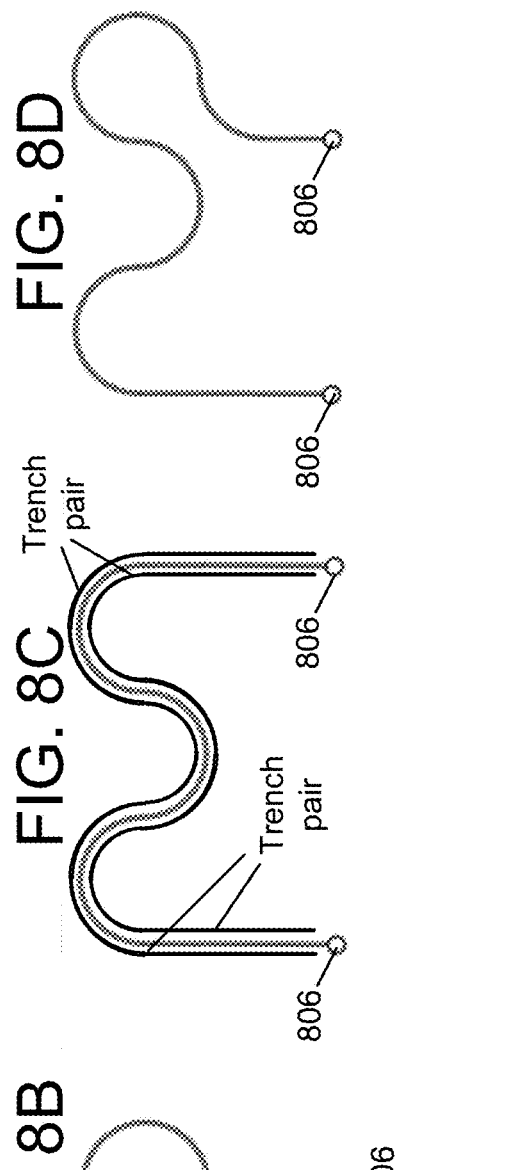
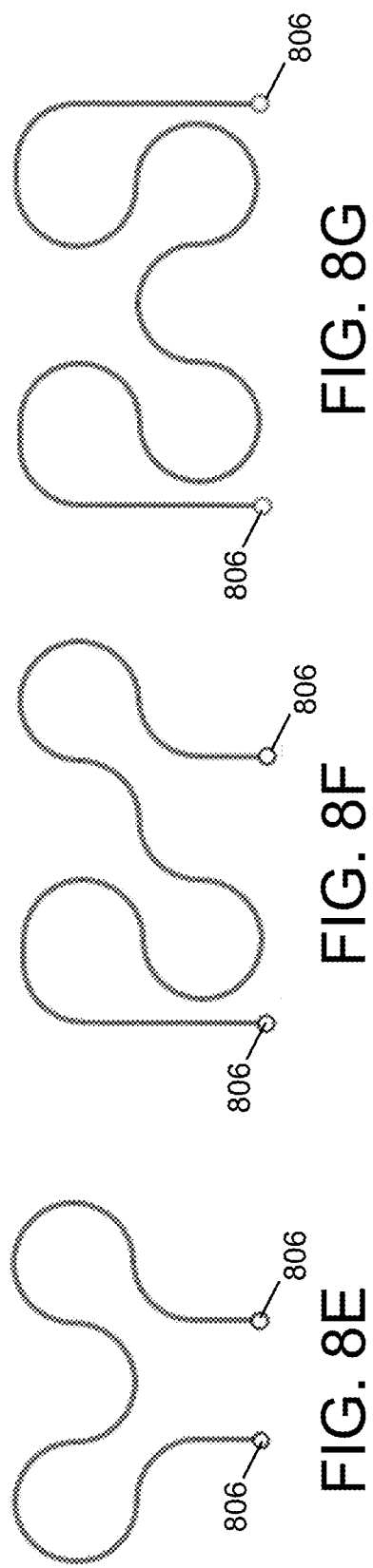
FIG. 8A FIG. 8B FIG. 8C FIG. 8D FIG. 8E FIG. 8F FIG. 8G

INTEGRATED OPTICAL POLARIZER AND METHOD OF MAKING SAME

BACKGROUND

The disclosure relates to a photonic integrate circuit (PIC) system and, more particularly, to an improved integrated optical polarizer to generate highly linear, polarized, single mode light to obtain the performance required by the application system.

An optic system comprising one or more PIC devices (e.g., chips) may be constructed for applications that require a stable output state of polarization. In systems for such applications, a light signal consisting of different polarizations may be processed with different efficiencies, and performance degradation may result when orthogonal polarizations are present. It is thus desirable for such systems to operate with a single polarization, which requires polarizing optical elements in the optical system. Integrated polarizers may be incorporated into a PIC to generate and maintain the light in a signal linear polarization state. Optic birefringence may be deliberately introduced into the components and waveguides, so the waveguides and components conduct and process light of a single linear polarization.

Components that provide a measure of polarization sensitivity may be used in conjunction with optical fibers for such applications. A problem arises, however, concerning the polarization state of the propagating waves. When linearly polarized light is coupled into a single-mode fiber, the light may become slightly randomized in polarization, and there may be conversion from linear to elliptical polarization. When light emerges from the fiber, it is highly likely that both orthogonal polarizations, known as the transverse magnetic (TM) and transverse electric (TE) modes in planar waveguides, will be excited and will be coupled to components of polarization sensitivity.

Applications that may employ an integrated polarizer may include, for example, optic interferometric modulators, optic interferometric sensors, wavelength-division multiplexing, electro-optic switching arrays, coherent optical communication modules, among others. One example of optic interferometric sensors is a hybrid fiber optic gyroscope (FOG), comprising a PIC and optic fiber coil.

A polarizer is a critical component in a FOG. A polarizer filters out spurious phase shifts due to parasitic interference and constrains the gyroscope bias. In a FOG that employs a Sagnac interferometer, it is a common practice to use sensing coils of polarization maintaining (PM) fiber. Due to stress to the birefringent PM fiber, the two counterpropagating waves at a point in the Sagnac interferometer may each exhibit a different state of polarization, and therefore each counterpropagating wave may be subject to a different effective refractive index. The different effective refractive indices may further produce a degree of non-reciprocity and yield a spurious phase difference at the output.

It has been shown theoretically that if a polarizer is placed at the base waveguide of the Y-junction of a Sagnac interferometer, to launch linearly polarized light in one of the polarization modes, the Sagnac interferometer circuit is substantially reciprocal. Light is thus filtered at the input, and the two counterpropagating waves that are coming back through this same polarizer are perfectly in phase at the output.

In practice, however, the rejection of the spurious phase error is limited by the polarization extinction ratio (PER) of the polarizer. There remains a residual phase difference between both counterpropagating waves if the polarizer is imperfect. It was further revealed that the bias error is limited by the amplitude PER, $\varepsilon$, of the polarizer instead by its intensity PER, $\varepsilon^2$, which is typically the basis for measuring and evaluating a polarizer PER. This implies that a polarizer with very high intensity PER is required to suppress the phase error caused by the polarization randomization in the Sagnac interferometer. As one example, to control a maximum phase measurement error in a FOG of $10^{-7}$ radians, a polarizer with 93 dB intensity PER would be required.

Optical waveguide polarizers function by allowing only one polarization state, either TE or TM mode, to propagate while the other polarization state is eliminated. An effective polarizer is characterized by low insertion loss and high PER. Integrated polarizers are based on the different propagation properties of the polarization modes that permit discrimination of either the TE or TM field by means of a strong attenuation on the mode in cross polarization.

Many types of integrated polarizers have been realized over the years, including metal-clad waveguides, birefringence waveguides in crystalline substrate such as $LiNbO_3$, waveguides that activate plasmonic modes by using metals, transition-metal oxides, graphene or transparent conducting oxides, dielectric polarizers based on resonant tunneling effect, shallowly-etched silicon-on-insulator ridge optical waveguides, symmetric etching of silicon nanowires, and waveguides with subwavelength gratings. These different types of polarizers require either additional layer of material for the enhancement of mode discrimination, or additional steps of process for the required structures, or fabrication with very tight accuracy, or special crystalline substrates.

It is worthwhile to mention that high-PER, low-loss polarizers have been reported in ultrathin $Si_3N_4$ waveguide. Series of connected s-shape bending waveguides that have ultra-loose mode confinement result in high propagation loss in TM mode while keep TE-mode loss low (see, e.g., FIG. 6E). The highest PER is 75 dB measured at 1600 nm on a planer polarizer comprising a half period of s-bend waveguide of 3.5 µm core wide and of 40 nm core height (FIG. 6A). The waveguide typically has birefringence within the range of 0.011~0.014 at 1550 nm wavelength (see, e.g., J. F. Bauters, M. J. R. Heck, D. Dai, J. S. Barton, D. J. Blumenthal, and J. E. Bowers, "Ultralow-Loss Planar Si3N4 Waveguide Polarizers," IEEE Photonics Journal, 5(1), Article S/N: 6600207 (2013)).

SUMMARY

The described embodiments are directed to a compact integrated polarizer with ultrahigh polarization extinction ratio that suitable to construct high-end tactical grade, or navigation grade, fiber optical gyroscope. The integrated polarizer of the described embodiments may exhibit a high intensity polarization extinction ratio (PER), while being relatively compact in size.

The integrated polarizer of the described embodiments has low insertion loss, high polarization extinction ratio and compact device size, and may be fabricated using the same materials as other components in a PIC system. An effective method and device are provided which can be mass produced using mature microfabrication technology and with low manufacture cost.

In one aspect, the invention may be an integrated optical polarizer comprising a planar substrate, an optical waveguide integrated on the substrate, and a polarizer section of the optical waveguide. The optical waveguide may have an input that defines an input direction of propagating light and an output that defines an output direction of propagating light that is opposite of the input direction of propagating light. The polarizer section of the optical waveguide may conduct a first polarization mode and attenuate a second polarization mode. The polarizer section of the optical waveguide may (i) be birefringent, and (ii) have a confinement characteristic of at most six percent.

The polarizer section and other components of photonic integrated circuit may comprise the same materials. The optical waveguide and the polarizer may be monolithically fabricated on the substrate. The integrated optical polarizer may further comprise a first Y-splitter having a first base waveguide, and a second Y-splitter having a second base waveguide. The integrated optical polarizer, the first Y-splitter, and the second Y-splitter may be (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

The integrated optical polarizer may further comprise a pair of trenches formed along the both sides of the integrated waveguide optical polarizer. The pair of trenches may be configured to deflect light radiated from the integrated waveguides away from the integrated circuit plane to prevent stray light from coupling into the integrated circuit. The integrated optical polarizer may further comprise a plurality of waveguide bends optically connected in series. The plurality of waveguide bends may comprise a first 180-degree bend, a second 180-degree bend, and at least one additional bend of at least 90 degrees.

The substrate may be a silicon wafer, and the optical waveguide may comprise a silicon nitride waveguide core and a silicon oxide waveguide cladding. The silicon nitride waveguide core may have a thickness of less than 50 nm. The optical waveguide may comprise a waveguide core having a rectangular cross-section with an aspect-ratio greater than 50. The integrated polarizer waveguide may be configured to support a TE polarization mode, and not configured to support a TM polarization mode.

In another aspect, the invention may be an integrated optical polarizer comprising a planar substrate, an optical waveguide integrated on the substrate, and a polarizer section of the optical waveguide that conducts a first polarization mode and attenuates a second polarization mode. The polarizer section of the optical waveguide may (i) be birefringent, (ii) have a confinement characteristic of at most six percent, and (iii) comprise a plurality of waveguide bends optically connected in series. The plurality of waveguide bends may comprise a first 180-degree bend, a second 180-degree bend, and at least one additional bend of at least 90 degrees.

The polarizer section and other components of photonic integrated circuit may comprise the same materials. The optical waveguide and the polarizer may be monolithically fabricated on the substrate. The integrated optical polarizer may further comprise a first Y-splitter having a first base waveguide, and a second Y-splitter having a second base waveguide. The integrated optical polarizer, the first Y-splitter, and the second Y-splitter are (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

The integrated optical polarizer may further comprise a pair of trenches formed along the both sides of the integrated waveguide optical polarizer. The pair of trenches may be configured to deflect light radiated from the integrated waveguides away from the integrated circuit plane, to prevent stray light from coupling into the integrated circuit. The integrated optical polarizer may further comprise a plurality of waveguide bends optically connected in series, the plurality of waveguide bends comprising a first 180-degree bend, a second 180-degree bend, and at least one additional bend of at least 90 degrees.

The substrate may be a silicon wafer, and the optical waveguide may comprise a silicon nitride waveguide core and a silicon oxide waveguide cladding. The silicon nitride waveguide core may have a thickness of less than 50 nm. The optical waveguide may comprise a waveguide core having a rectangular cross-section with an aspect-ratio greater than 50. The integrated polarizer waveguide may be configured to support a TE polarization mode, and not configured to support a TM polarization mode.

In another aspect, the invention may be an integrated waveguide optical polarizer comprising a planar substrate, and an integrated waveguide formed over the substrate. The optical waveguide may have an input that defines an input direction of propagating light and an output that defines an output direction of propagating light that is opposite of the input direction of propagating light. The optical waveguide may have a polarizer that conducts one polarization mode and attenuates the other polarization mode. The integrated waveguide may be birefringent and have a higher effective modal refractive index than the refractive index of the cladding material, such that the difference between the two refractive indices is less than 0.004. The polarizer may comprise a plurality of arc waveguides, each having a length of $\pi/2$ radians. The arc waveguides may be arranged such that (i) each arc waveguide is characterized by a bending radius configured to facilitate radiation loss of a polarization mode having a larger mode-field dimension, (ii) the arc waveguides are optically connected in series to form an arc waveguide train, (iii) a number the arcs in the arc waveguide train facilitates a specific polarization extinction ratio, and (iv) at least one individual group of two or three adjacent waveguides in the arc waveguide train are arranged such that centers of the arc waveguides in each of the individual groups are located on a same side of the arc waveguide train, and the centers of the arc waveguides in adjacent individual groups are located on the different sides of the arc waveguide train.

The polarizer section may comprise the same materials as the rest of photonic integrated circuit. The structure of the integrated polarizer and the rest of photonic integrated circuit may be monolithically fabricated on the substrate.

The integrated waveguide optical polarizer may further comprise a first Y-splitter having a first base waveguide, and a second Y-splitter having a second base waveguide. The integrated optical polarizer, the first Y-splitter, and the second Y-splitter may be (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

The integrated waveguide optical polarizer may further comprise a pair of trenches formed along the both sides of the integrated waveguide optical polarizer. The pair of trenches may be configured to deflect light radiated from the integrated waveguides away from the integrated circuit plane to prevent stray light from coupling into the integrated circuit.

The arc waveguide train may comprise more than five of the arc waveguides of π/2 radian length. The substrate may be a silicon wafer, the waveguide core may be silicon nitride, and the waveguide cladding may be silicon oxide. The waveguide may be formed by an ultrathin core such that the silicon nitride thickness is less than 50 nm. The optical waveguide may comprise a waveguide core having a rectangular cross-section with an aspect-ratio greater than 50. The integrated polarizer waveguide may be configured to support a TE polarization mode, and may not be configured to support a TM polarization mode.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A shows an example embodiment of a photonic integrated circuit (PIC) built on a substrate, according to the invention.

FIG. 1B shows another example embodiment of a PIC built on a substrate, according to the invention.

FIGS. 7A through 7E illustrate examples of integrated polarizers according to embodiments of the invention.

FIGS. 8A through 8G illustrate alternative examples of integrated polarizers according to embodiments of the invention.

DETAILED DESCRIPTION

Figure 2A:
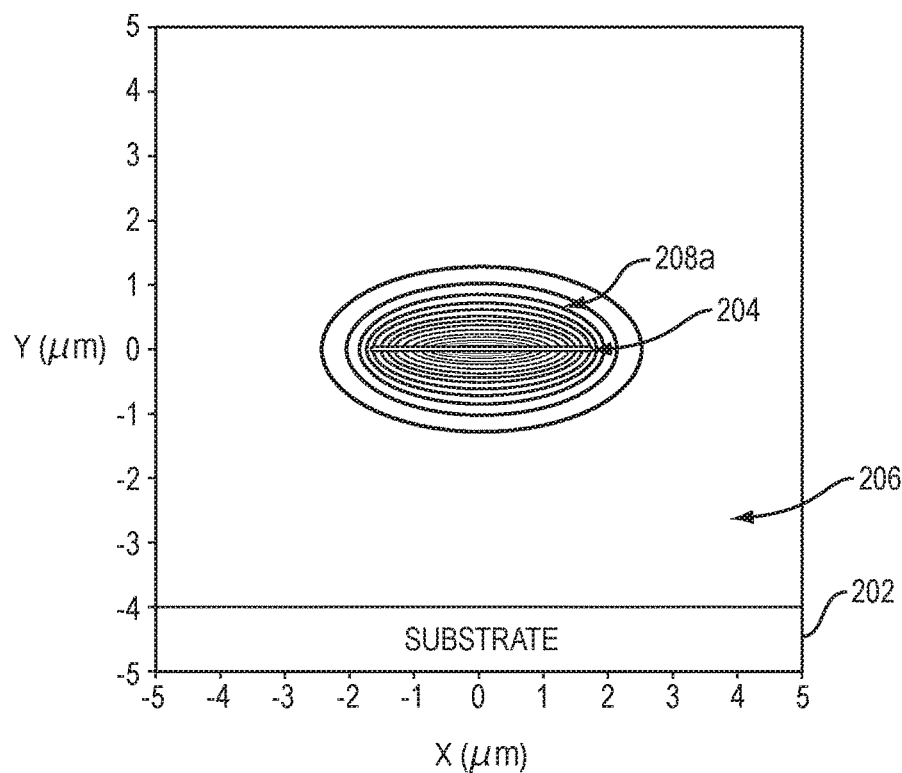
FIGS. 2A and 2B depict an example embodiment of a waveguide structure for polarizer construction, according to the invention.

A description of example embodiments follows.

The teachings of all patents, published applications and references cited herein are incorporated by reference in their entirety. While the present teachings are described in conjunction with various embodiments and examples, it is not intended that the present teachings be limited to such embodiments. On the contrary, the present teachings encompass various alternatives and equivalents, as will be appreciated by those of skill in the art.

FIG. 1A shows an example embodiment of a photonic integrated circuit (PIC) 100 built on a substrate 102. The PIC comprises an integrated polarizer 104 (the area enclosed by the dotted line) and two Y-junctions 106a, 106b, with their base waveguides 108a, 108b, respectively, connecting to the both ends of the polarizer 104, respectively. The polarizer comprises six arc waveguides, each of π/2 radian length and of the same radius, connected in series, and the directions of its input and output ports are in opposite directions. As used herein, the direction of an input or output port refers to the direction of propagation of light associated with that port. Arrow 110a represents the direction of light associated with a first port 112a of the polarizer 104, and arrow 110b represents the direction of light associated with a second port 112b of the polarizer 104. As shown in FIG. 1A, arrows 110a and 110b are in opposite directions FIG. 1B shows another example embodiment of a PIC 120 built on a substrate 122. The PIC comprises an integrated polarizer 124 and two Y-junctions 126a, 126b, with their base waveguides 128a, 128b, respectively, connecting to the both ends of the polarizer 124, respectively. The polarizer 124 has six arc waveguides, each of π/2 radian length and of the same radius, connected in series, and the directions of its input port 130a and output port 130b are in the same direction.

Figure 2B:
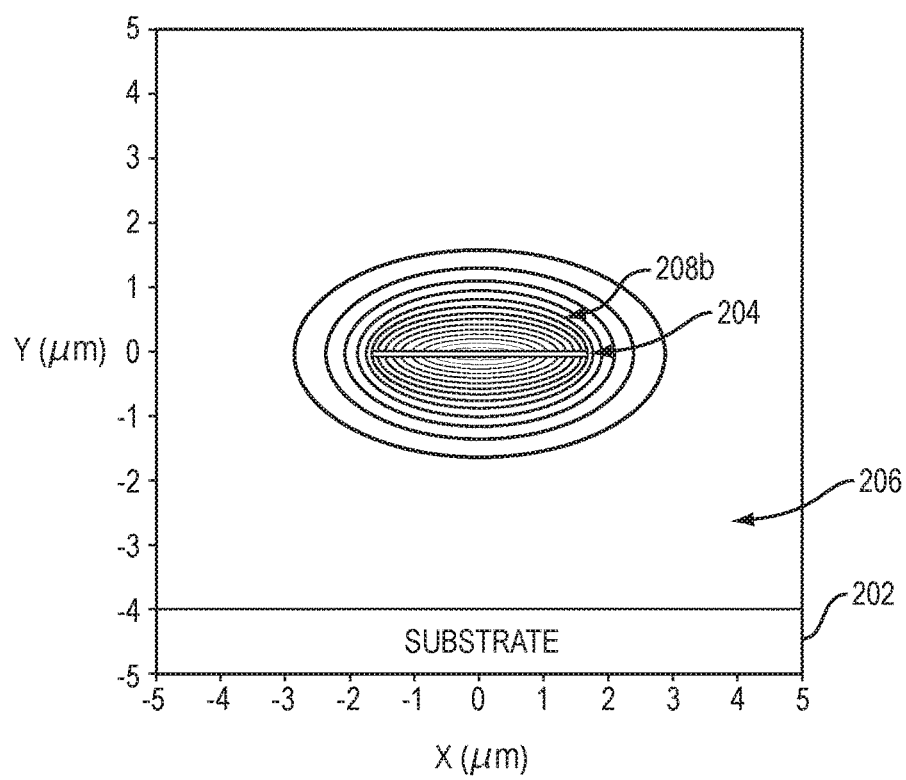

FIGS. 2A and 2B depict an example embodiment of a waveguide structure for construction of the polarizers described herein, in a cross-section view. The waveguide comprises a substrate 202, a waveguide core 204 surrounded by a waveguide cladding material 206. The substrate 202, which in the example embodiment may be a silicon wafer, is a carrier for the waveguide structure. The waveguide core 204 has a higher refractive index than that of the waveguide cladding material 206, which in the example embodiment may be silicon oxide. The waveguide core 204 may be configured to have a high aspect ratio, such that the waveguide structure supports only a single mode, the fundamental transverse mode. The waveguide may be characterized by a high birefringence, and the waveguide may have a mode confinement that is loose. Due to the waveguiding conditions described above, only a small percentage of the mode field is distributed within the waveguide core, and large percentage of the mode field is stretched out into the cladding material as an evanescent wave.

FIG. 2A presents a contour map 208a of the TE mode superposed on the waveguide cross-section profile. FIG. 2B is a contour map 208b of the TM mode superposed on the same waveguide profile. The steps have a same value between the adjacent contour lines in the two figures. The above-mentioned waveguiding conditions also result in a larger mode-field dimensions of the TM mode than that of the TE mode, as indicated by a comparison of FIG. 2A and FIG. 2B. Because of the TM mode is more loosely confined than the TE mode, the TM mode experiences a higher bending loss than that of the TE mode. The layout of the waveguide is configured as bended in shape as shown by the waveguide layouts in the area enclosed by the dotted line (reference number 104) in FIG. 1.

It is well known that the evanescent wave (i.e., the percentage of the mode field extended in the waveguide cladding area 206 beyond the core 204) increases when the wavelength of the guided light becomes longer, which is equivalent to the decrease of normalized frequency, or v-number, of the waveguide. If the waveguide is arranged to bend at a fixed radius, the waveguide is characterized by a high propagation loss (i.e., becomes "leaky"), when the wavelength is longer than a certain "critical wavelength." Since the TM mode has a looser mode confinement than that of the TE mode, the critical wavelength for TM mode is shorter than that for TE mode in the waveguide. There will thus be a wavelength window in which the TE mode has low propagation loss while the TM mode is highly attenuated. This configuration constitutes a polarizer of low TE mode loss but high TM mode discrimination.

Figure 3A:
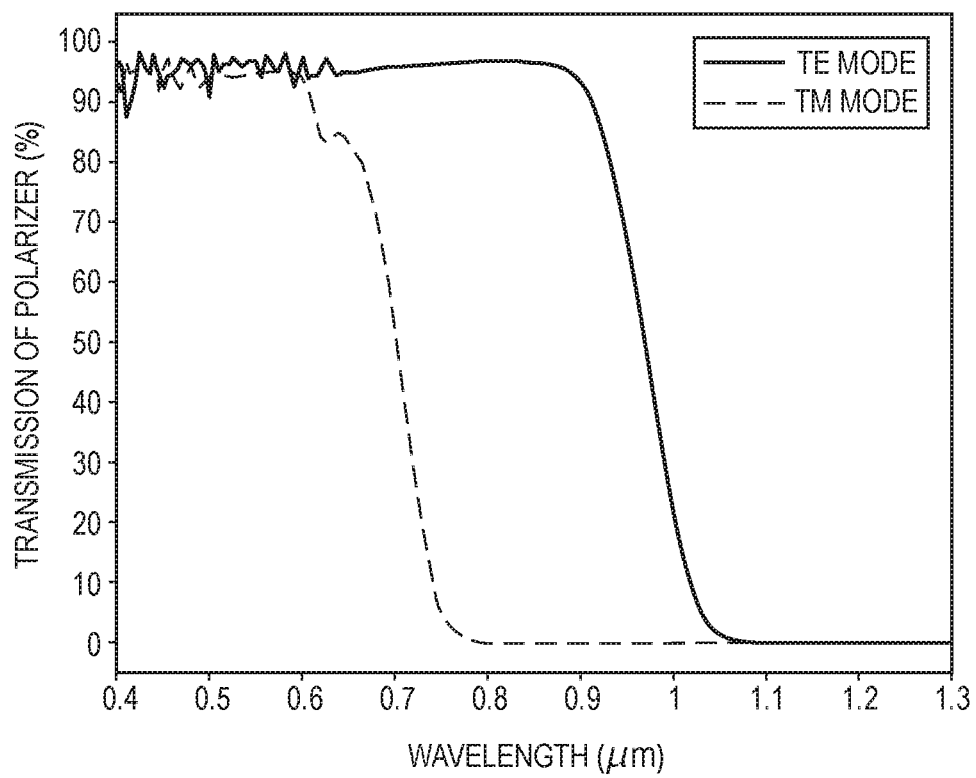
FIGS. 3A and 3B depict an example of the dependence of waveguide transmission on the wavelength of the TE and TM modes of the polarizer.
Figure 3B:
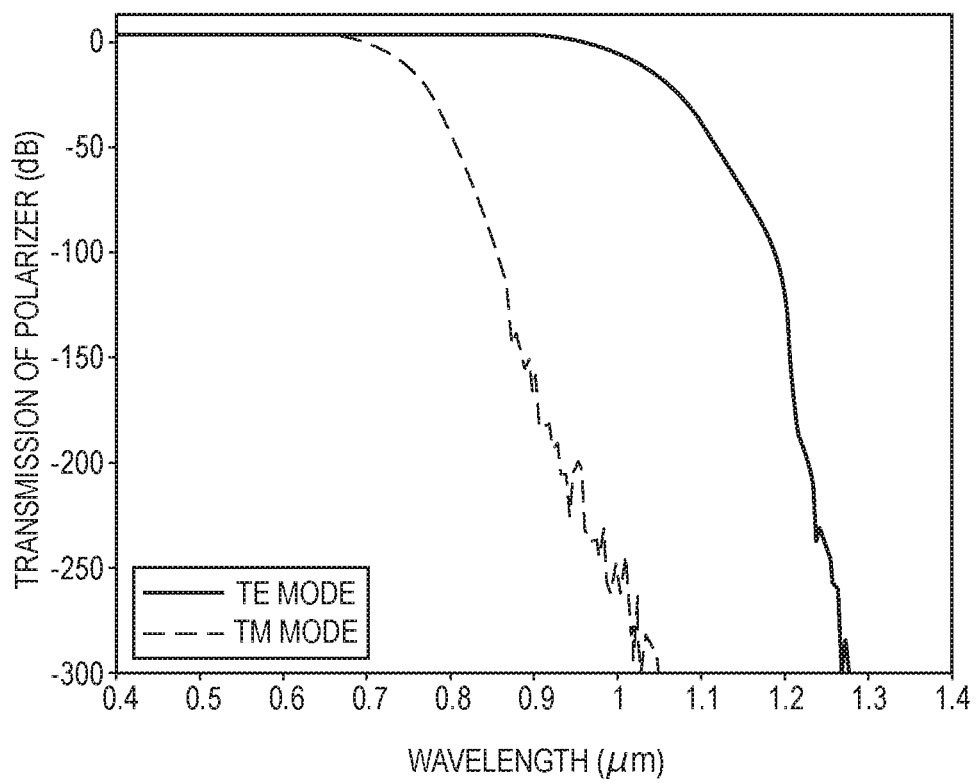

FIGS. 3A and 3B demonstrate an example of the dependence of waveguide transmission on the wavelength of the TE and TM modes of the polarizer described in the FIG. 1A. In the FIGS. 3A and 3B, the y-axis is in linear scale and in logarithmic scale, respectively. In a wavelength window between 810 nm to 910 nm, the PER of the polarizer is between 50 dB to 170 dB, while the TE mode propagation loss is less than 0.3 dB.

Figure 4A:
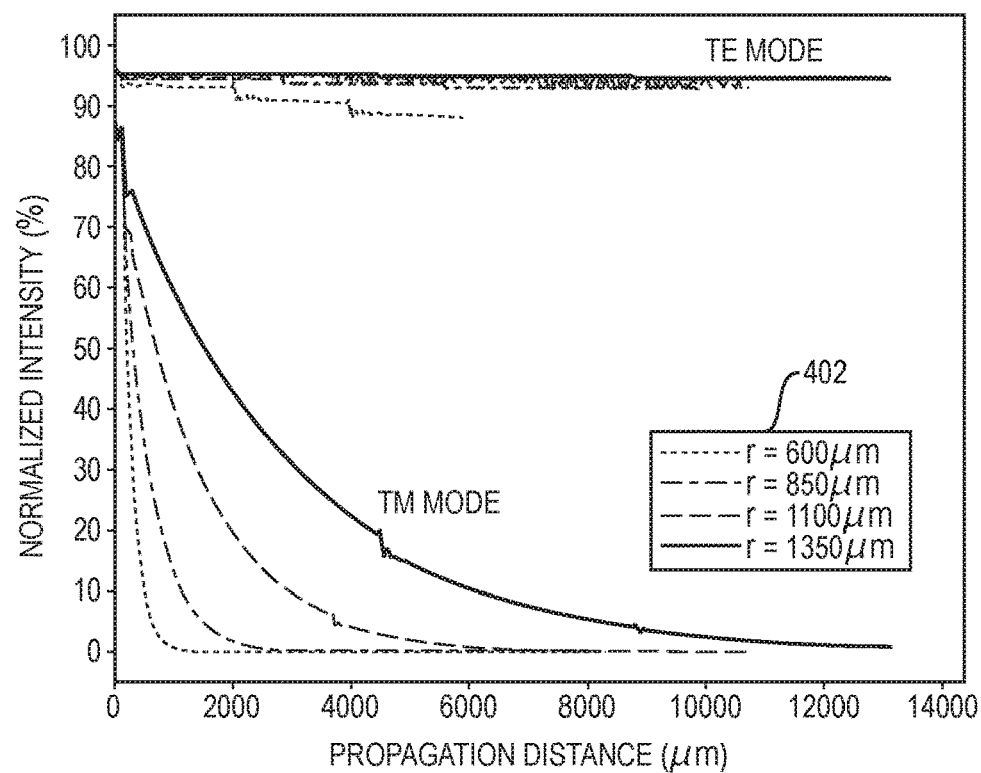
FIGS. 4A and 4B show the behaviors of example embodiments of integrated polarizers, according to the invention.
Figure 4B:
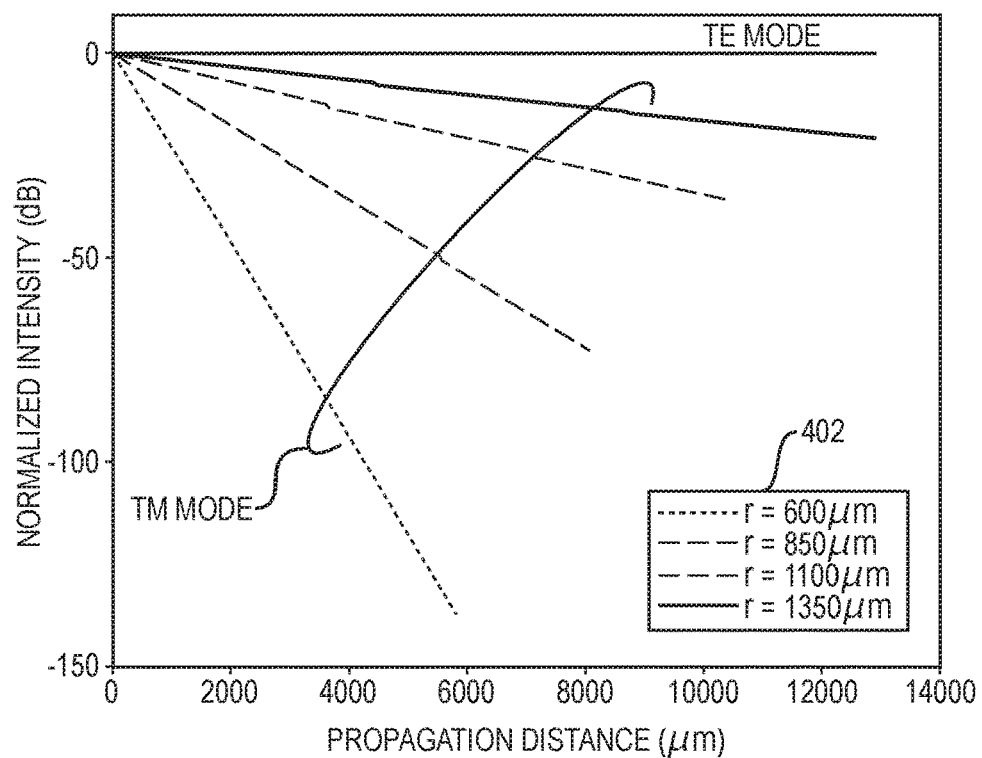

The PER of a polarizer can be further improved while a low-loss TE mode transmission can be maintained. FIGS. 4A and 4B show the behaviors of example embodiments of integrated polarizers, comprised of three half-circle bending waveguides, each having different bending radius as shown in bending radius key 402. When the bending radius decreases from 1350 µm to 600 µm, the PER of the polarizers increases from 20 dB to 133 dB, while the loss of the TE mode of all the polarizers is less than 0.5 dB.

Figure 5:
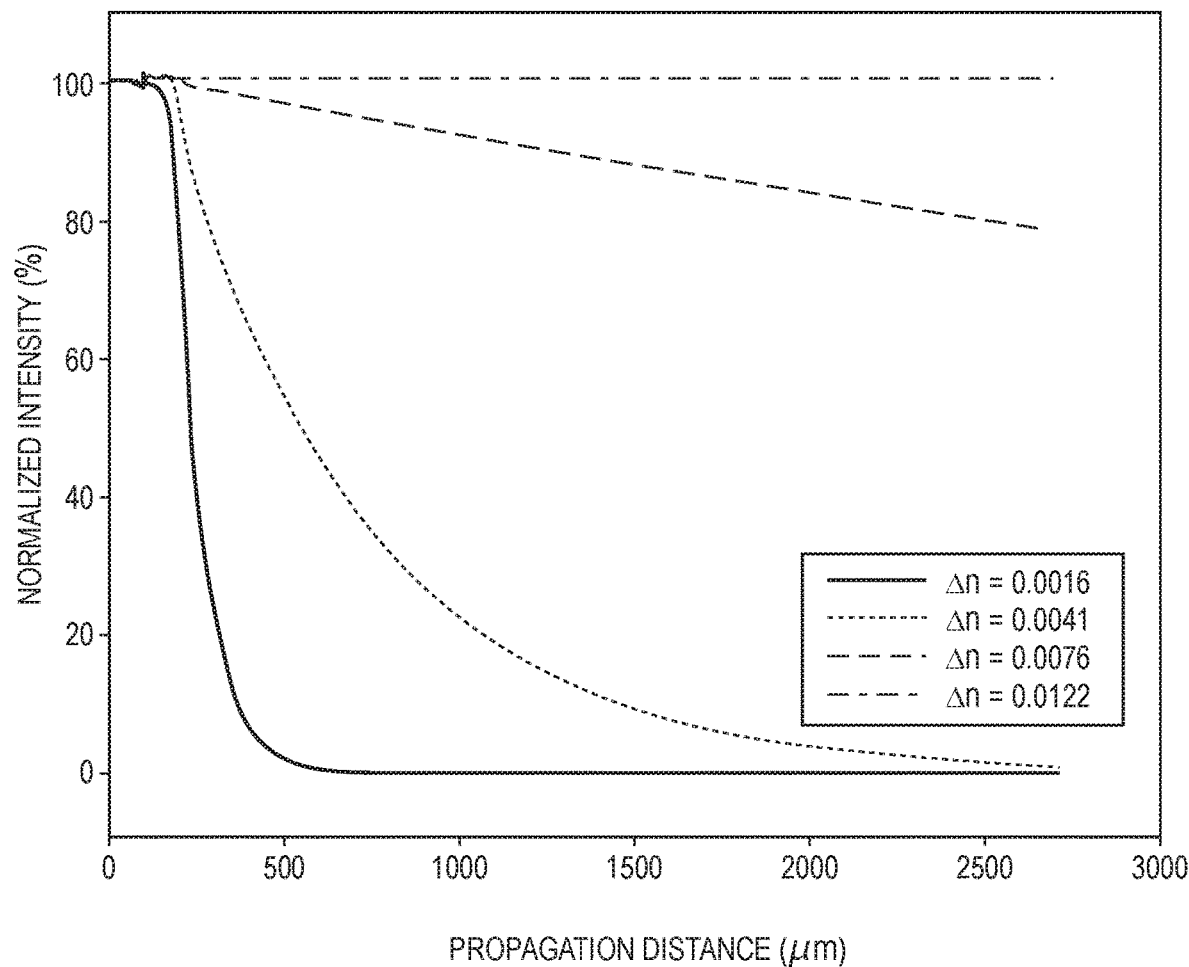
FIG. 5 shows that the propagation loss of an example waveguide for various differences between effective index of waveguide and index of cladding material, according to the invention.

The polarization mode to be eliminated should be loosely (weakly) confined by the waveguide, which causes that mode to experience high losses through radiation. The degree of the confinement of the mode is dependent on $\Delta n = RI_{effective\_modal} - RI_{cladding\_material}$, which is the difference of the effective modal refractive index of the waveguide ($RI_{effective\_modal}$) from the refractive index of the cladding material ($RI_{cladding\_material}$). A waveguide with a smaller difference ($\Delta n$) between these refractive indices experiences a looser (or equivalently, weaker) modal confinement, since a larger percentage of the mode-field portion is extended into the surrounding cladding area, which results in a higher radiation loss associated with the waveguide. FIG. 5 shows that the propagation loss of the waveguide that has index differences of 0.0016, 0.0041, 0.0076 and 0.0122 is 456 dB/cm, 72.2 dB/cm, 3.95 dB/cm and 0.06 dB/cm, respectively.

Figure 6A:
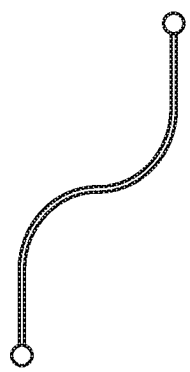
FIGS. 6A through 6E show examples of prior implementations of integrated polarizers.
Figure 6B:
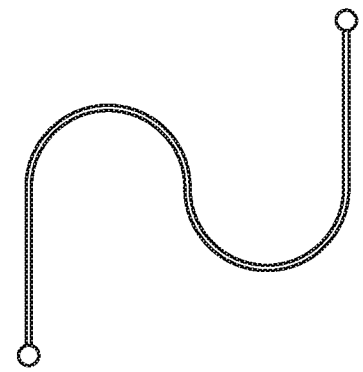
Figure 6C:
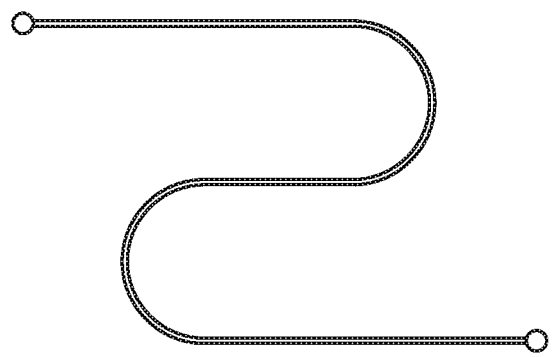
Figure 6D:
Figure 6E:

FIGS. 6A through 6E show examples of prior implementations of integrated polarizers, which typically comprise one or more single s-bend (i.e., π/2 radian length, or equivalently, 90 degree length) waveguides. FIGS. 6A and 6D are examples of two π/2 radian length waveguide bends, FIGS. 6B and 6C are examples of four π/2 radian length waveguide bends, and FIG. 6E shows a waveguide with multiple shallowly waving π/2 s-bends.

FIGS. 7A through 7E illustrate five examples of integrated polarizers according to embodiments of the invention. These embodiments arrange the two waveguide connectors on the different side of the integrated circuit such that it enables the input and output signals of the polarizer to propagate in the same direction. For example, FIG. 7A shows input light 702 and output light 704. As illustrated, the waveguide arrangement facilitates the input light 702 and the output light 704 oriented in the same direction.

The integrated polarizers depicted in FIGS. 7A through 7E comprise a series connection of from six to fourteen π/2 radian length arc bends. The waveguide shown in FIG. 7A comprises six π/2 radian arc bends. The waveguide shown in FIG. 7B comprises eight π/2 radian arc bends. The waveguide shown in FIG. 7C comprises ten π/2 radian arc bends. The waveguide shown in FIG. 7D comprises twelve π/2 radian arc bends, and the waveguide shown in FIG. 7E comprises fourteen π/2 radian arc bends.

The circles shown at the ends of the waveguides in FIGS. 7A through 7E represent optical connectors 706. Further optical connections, for example to integrated waveguides or optical fibers, can be realized at these connectors. A pair of trenches can be formed along the both sides of the integrated waveguide optical polarizer, so that the trenches deflect the radiated light from the integrated waveguides out of the integrated circuit plane, and prevent stray light from coupling into the integrated circuit.

The integrated polarizers depicted in FIGS. 8A through 8G are examples of polarizers according to embodiments of the invention. These embodiments arrange the connectors on the same side of the integrated circuit such that it enables the input and output signals of the polarizer to propagate in opposite directions. For example, FIG. 8A shows input light 802 and output light 804. As illustrated, the waveguide arrangement facilitates the input light 802 and the output light 804 oriented in the opposite directions.

The integrated polarizers depicted in FIGS. 8A through 8G comprise a series connection of from two to fourteen π/2 radian length arc bends. The waveguide shown in FIG. 8A comprises two π/2 radian arc bends. The waveguide shown in FIG. 8B comprises four π/2 radian arc bends. The waveguide shown in FIG. 8C comprises six π/2 radian arc bends. The waveguide shown in FIG. 8D comprises eight π/2 radian arc bends. The waveguide shown in FIG. 8E comprises ten π/2 radian arc bends. The waveguide shown in FIG. 8F comprises twelve π/2 radian arc bends, and the waveguide shown in FIG. 8G comprises fourteen π/2 radian arc bends.

The circles shown at the ends of the waveguides in FIGS. 8A through 8G represent optical connectors 806. Further optical connections, for example to integrated waveguides or optical fibers, can be realized at these connectors. A pair of trenches can be formed along the both sides of the integrated waveguide optical polarizer, so that the trenches deflect the radiated light from the integrated waveguides out of the integrated circuit plane, and prevent stray light from coupling into the integrated circuit.

While example embodiments have been particularly shown and described, it will be understood by those skilled in the art that various changes in form and details may be made therein without departing from the scope of the embodiments encompassed by the appended claims.

What is claimed is:

1. An integrated optical polarizer comprising:
   a planar substrate;
   an optical waveguide integrated on the substrate, the optical waveguide having an input that defines an input direction of propagating light and an output that defines an output direction of propagating light that is opposite of the input direction of propagating light, the optical waveguide further comprising a waveguide core having a rectangular cross-section with an aspect-ratio greater than 50; and
   a polarizer section of the optical waveguide that conducts a first polarization mode and attenuates a second polarization mode, the polarizer section of the optical waveguide (i) being birefringent, and (ii) being configured to have a confinement characteristic of at most six percent.

2. The integrated optical polarizer of claim 1, wherein the polarizer section and other components of photonic integrated circuit comprise the same materials.

3. The integrated optical polarizer of claim 1, wherein the optical waveguide and the polarizer are monolithically fabricated on the substrate.

4. The integrated optical polarizer of claim 3, further comprising a first Y-splitter having a first base waveguide, and a second Y-splitter having a second base waveguide, wherein the integrated optical polarizer, the first Y-splitter, and the second Y-splitter are (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

5. The integrated optical polarizer of claim 1, further comprising a pair of trenches formed along the both sides of the integrated waveguide optical polarizer, the pair of trenches configured to deflect light radiated from the integrated waveguides away from the integrated circuit plane to prevent stray light from coupling into the integrated circuit.

6. The integrated optical polarizer of claim 1, further comprising a plurality of waveguide bends optically connected in series, the plurality of waveguide bends comprising a first 180-degree bend, a second 180-degree bend, and at least one additional bend of at least 90 degrees.

7. The integrated optical polarizer of claim 1, wherein the substrate is a silicon wafer, and the optical waveguide comprises a silicon nitride waveguide core and a silicon oxide waveguide cladding.

8. The integrated optical polarizer of claim 7, wherein the silicon nitride waveguide core has a thickness of less than 50 nm.

9. The integrated optical polarizer of claim 1, wherein the integrated polarizer waveguide is configured to support a TE polarization mode, and is not configured to support a TM polarization mode.

10. An integrated optical polarizer comprising:
a planar substrate;
an optical waveguide integrated on the substrate the optical waveguide comprising a waveguide core having a rectangular cross-section with an aspect-ratio greater than 50; and
a polarizer section of the optical waveguide that conducts a first polarization mode and attenuates a second polarization mode, the polarizer section of the optical waveguide (i) being birefringent, (ii) being configured to have a confinement characteristic of at most six percent, and (iii) comprising a plurality of waveguide bends optically connected in series, the plurality of waveguide bends comprising a first 180-degree bend, a second 180-degree bend, and at least one additional bend of at least 90 degrees.

11. The integrated optical polarizer of claim 10, wherein the polarizer section and other components of photonic integrated circuit comprise the same materials.

12. The integrated optical polarizer of claim 10, wherein the optical waveguide and the polarizer are monolithically fabricated on the substrate.

13. The integrated optical polarizer of claim 12, further comprising a first Y-splitter having a first base waveguide, and a second Y-splitter having a second base waveguide, wherein the integrated optical polarizer, the first Y-splitter, and the second Y-splitter are (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

14. The integrated optical polarizer of claim 10, further comprising a pair of trenches formed along the both sides of the integrated waveguide optical polarizer, the pair of trenches configured to deflect light radiated from the integrated waveguides away from the integrated circuit plane to prevent stray light from coupling into the integrated circuit.

15. The integrated optical polarizer of claim 10, further comprising a plurality of waveguide bends optically connected in series, the plurality of waveguide bends comprising a first 180-degree bend, a second 180-degree bend, and at least one additional bend of at least 90 degrees.

16. The integrated optical polarizer of claim 10, wherein the substrate is a silicon wafer, and the optical waveguide comprises a silicon nitride waveguide core and a silicon oxide waveguide cladding.

17. The integrated optical polarizer of claim 16, wherein the silicon nitride waveguide core has a thickness of less than 50 nm.

18. The integrated optical polarizer of claim 10, wherein the integrated polarizer waveguide is configured to support a TE polarization mode, and is not configured to support a TM polarization mode.

19. An integrated waveguide optical polarizer comprising:
a planar substrate; and
an integrated waveguide formed over the substrate, the optical waveguide having an input that defines an input direction of propagating light and an output that defines an output direction of propagating light that is opposite of the input direction of propagating light, and having a polarizer that conducting one polarization mode and attenuating the other polarization mode;
the integrated waveguide is birefringent and has a higher effective modal refractive index than the refractive index of the cladding material, such that the difference between the two refractive indices is less than 0.004; and
the polarizer comprises a plurality of arc waveguides, each having a length of $\pi/2$ radians, and the arc waveguides are arranged such that:
(i) each arc waveguide is characterized by a bending radius configured to facilitate radiation loss of a polarization mode having a larger mode-field dimension;
(ii) the arc waveguides are optically connected in series to form an arc waveguide train;
(iii) a number the arcs in the arc waveguide train facilitates a specific polarization extinction ratio; and
(iv) at least one individual group of two or three adjacent waveguides in the arc waveguide train are arranged such that:
(a) centers of the arc waveguides in each of the individual groups are located on a same side of the arc waveguide train; and
(b) the centers of the arc waveguides in adjacent individual groups are located on the different sides of the arc waveguide train.

20. The integrated waveguide optical polarizer of claim 19, wherein the polarizer section comprises the same materials as the rest of photonic integrated circuit.

21. The integrated waveguide optical polarizer of claim 19, wherein the structure of the integrated polarizer and the rest of photonic integrated circuit are monolithically fabricated on the substrate.

22. The integrated waveguide optical polarizer of claim 21, further comprising a first Y-splitter having a first base waveguide, and a second Y-splitter having a second base waveguide, wherein the integrated optical polarizer, the first Y-splitter, and the second Y-splitter are (i) monolithically fabricated on a common substrate, and (ii) configured such that the first base waveguide is optically coupled to a first end of the integrated waveguide optical polarizer, and the second base waveguide is optically coupled to a second end of the integrated waveguide optical polarizer, consistent with a fiber optic gyroscope architecture.

23. The integrated waveguide optical polarizer of claim 19, further comprising a pair of trenches formed along the both sides of the integrated waveguide optical polarizer, the pair of trenches configured to deflect light radiated from the integrated waveguides away from the integrated circuit plane to prevent stray light from coupling into the integrated circuit.

24. The integrated waveguide optical polarizer of claim 19, wherein the arc waveguide train comprises more than five of the arc waveguides of $\pi/2$ radian length.

25. The integrated waveguide optical polarizer of claim 19, wherein (i) the substrate is a silicon wafer, (ii) the waveguide core is silicon nitride, and (iii) the waveguide cladding is silicon oxide.

26. The integrated waveguide optical polarizer of claim 25, wherein the waveguide is formed by an ultrathin core such that the silicon nitride thickness is less than 50 nm.

27. The integrated waveguide optical polarizer of claim 19, wherein the optical waveguide comprises a waveguide core having a rectangular cross-section with an aspect-ratio greater than 50.

28. The integrated waveguide optical polarizer of claim 19, wherein the integrated polarizer waveguide is configured to support a TE polarization mode, and is not configured to support a TM polarization mode.

* * * * *